US012571435B2

(12) United States Patent　　(10) Patent No.:　US 12,571,435 B2

Wynkoop et al.　　(45) Date of Patent:　　Mar. 10, 2026

(54) VELOCITY-BASED CONTROL METHODS FOR A ROTARY DISCONNECT SYSTEM

(71) Applicant: HUSCO Automotive Holdings LLC, Waukesha, WI (US)

(72) Inventors: Trevor Wynkoop, Milwaukee, WI (US); Matthew Pellmann, Summit, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 0 days.

(21) Appl. No.: 18/412,300

(22) Filed: Jan. 12, 2024

(65) Prior Publication Data

US 2024/0240677 A1　　Jul. 18, 2024

Related U.S. Application Data

(60) Provisional application No. 63/439,000, filed on Jan. 13, 2023.

(51) Int. Cl.
*F16D 27/118*　　(2006.01)

(52) U.S. Cl.
CPC .................................. *F16D 27/118* (2013.01)

(58) Field of Classification Search
CPC ...... F16D 27/118; F16D 28/00; F16D 48/064; F16D 11/14; F16D 48/10; F16D 2500/1025; F16D 2500/3026; F16D 2500/50239; F16D 2500/50607; F16D 2500/70418; F16D 2500/7042; F16D 2500/70605; F16D 11/10; F16D 2011/002; F16D 2500/70615; F16H 63/304; F16H 2061/2853; F16H 2063/3093; F16H 2063/325; F16H 2061/2823

See application file for complete search history.

(56) References Cited

U.S. PATENT DOCUMENTS

| | | |
|---|---|---|
| 7,143,883 B2 | 12/2006 | McCalla et al. |
| 8,324,887 B2 | 12/2012 | Fuhrer |
| 8,965,616 B2 | 2/2015 | Gibson et al. |

(Continued)

FOREIGN PATENT DOCUMENTS

| | | |
|---|---|---|
| CN | 110740894 A | 1/2020 |
| DE | 102008011559 A1 | 9/2009 |

(Continued)

OTHER PUBLICATIONS

European Patent Office, Extended Search Report, Application No. 24151688.9, Jun. 17, 2024, 7 pages.

*Primary Examiner* — Farhana Pervin

(74) *Attorney, Agent, or Firm* — Quarles & Brady LLP

(57) ABSTRACT

A disconnect system for selectively coupling or disconnecting a drive member and a driven member. The disconnect system includes a clutch ring rotationally coupled to a drive member, a solenoid actuator, and a clutch ring configured to be moved by the solenoid actuator to selectively transition the clutch ring between an engaged position where the clutch ring is rotationally coupled to a driven member and a disengaged position where the clutch ring is disconnected from the driven member. A controller can be provided to control the axial velocity of the clutch ring (e.g., relative to the rotational axis thereof) to reduce unwanted noise, vibrations, or harshness that can occur during the transition between engaged and disengaged positions.

18 Claims, 13 Drawing Sheets

(56)                  References Cited

U.S. PATENT DOCUMENTS

| | | | |
|---|---|---|---|
| 8,983,744 B2 | 3/2015 | Komura et al. | |
| 9,784,321 B2 | 10/2017 | Pritchard | |
| 9,845,834 B2 | 12/2017 | Kohlbock et al. | |
| 10,995,854 B2 | 5/2021 | Schulte et al. | |
| 11,390,160 B2 | 7/2022 | McBride et al. | |
| 11,697,344 B2 | 7/2023 | Bird et al. | |
| 11,976,692 B1* | 5/2024 | Lee | F16D 23/14 |
| 2003/0096671 A1 | 5/2003 | Tanzer et al. | |
| 2005/0217952 A1* | 10/2005 | Usui | F16D 65/18 |
| | | | 188/162 |
| 2010/0276245 A1 | 11/2010 | Umeno et al. | |
| 2011/0061487 A1 | 3/2011 | Tooman et al. | |
| 2012/0067689 A1 | 3/2012 | Eastman | |
| 2014/0188358 A1 | 7/2014 | Joeng | |
| 2014/0342874 A1* | 11/2014 | Kohlbock | B60W 10/02 |
| | | | 192/84.92 |
| 2015/0308519 A1* | 10/2015 | Heravi | F16D 48/064 |
| | | | 192/84.92 |
| 2015/0354643 A1 | 12/2015 | Ebuchi et al. | |
| 2015/0380144 A1* | 12/2015 | Heravi | H01F 7/081 |
| | | | 335/229 |
| 2016/0040733 A1* | 2/2016 | Staniewicz | B60K 25/02 |
| | | | 701/67 |
| 2016/0146341 A1 | 5/2016 | Hoefflin et al. | |
| 2016/0312866 A1* | 10/2016 | Zink | F16H 63/18 |
| 2019/0128417 A1 | 5/2019 | Schulte et al. | |
| 2020/0047615 A1 | 2/2020 | Eschenburg et al. | |
| 2022/0194224 A1* | 6/2022 | Yoon | F16D 23/10 |
| 2022/0340004 A1* | 10/2022 | Bird | B60K 17/356 |
| 2022/0381340 A1 | 12/2022 | Pellmann et al. | |
| 2023/0160437 A1* | 5/2023 | Schmidt-Winkel | F16D 11/06 |
| | | | 192/29 |
| 2023/0417310 A1* | 12/2023 | Verhoog | F16D 11/14 |
| 2024/0019005 A1* | 1/2024 | Houser | F16D 48/06 |
| 2024/0271669 A1* | 8/2024 | Maringer | F16D 48/064 |

FOREIGN PATENT DOCUMENTS

| | | | |
|---|---|---|---|
| DE | 102008061509 A1 | 6/2010 | |
| EP | 1308648 A1 | 5/2003 | |
| JP | H0651615 U | 7/1994 | |

* cited by examiner

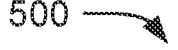
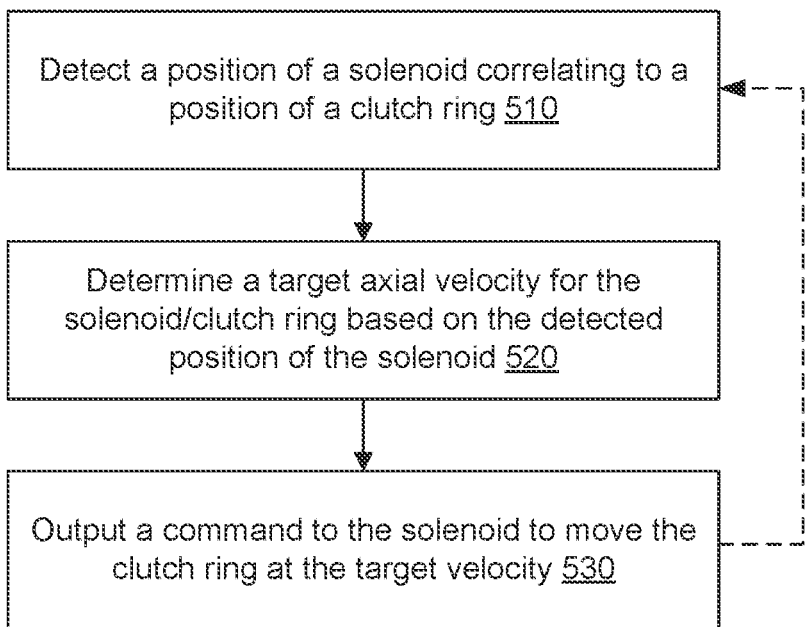
FIG. 7

600

Command a solenoid to actuate a clutch ring to target a first axial velocity from a disengaged position toward an engaged position 610

Command the solenoid to actuate the clutch ring to target a second axial velocity at or about a tooth abutment position 620

Command the solenoid to actuate the clutch ring to target a third axial velocity at a position between the tooth abutment position and the engaged position 630

Command the solenoid to actuate the clutch ring to target a fourth axial velocity at or about the engaged position 640

FIG. 9

VELOCITY-BASED CONTROL METHODS FOR A ROTARY DISCONNECT SYSTEM

CROSS-REFERENCES TO RELATED APPLICATIONS

This application is based on and claims priority to U.S. Provisional Patent Application No. 63/439,000 filed on Jan. 13, 2023, the entire disclosure of which is incorporated herein by reference.

STATEMENT REGARDING FEDERALLY SPONSORED RESEARCH

Not Applicable.

BACKGROUND

In general, disconnects for automotive applications (e.g., vehicles with engines, motors, etc.) may be used to engage/disengage a driven member from a drivetrain/transmission of a vehicle.

BRIEF SUMMARY

In one aspect, the present disclosure provides a method of controlling a rotary disconnect mechanism. The method can include detecting, with a sensor, a position of a clutch ring between a first position and a second position to selectively move the clutch ring axially between a disengaged position and an engaged position. In the engaged position, the clutch ring can be rotationally coupled to a driven member, and in the disengaged position, the clutch ring can be disconnected from the driven member. Additionally, a target axial velocity for the clutch ring can be determined based on the detected position. A command can be provided to a solenoid to move the clutch ring to the target axial velocity.

In one aspect, the present disclosure provides a method of controlling a rotary disconnect mechanism. The method can include commanding a solenoid to actuate a clutch ring to target a first axial velocity from a disengaged position toward an engaged position. The clutch ring can be rotationally coupled to a driven member (e.g., a wheel hub) in the engaged position and rotationally decoupled from the driven member in the disengaged position. The method can further include commanding the solenoid to actuate the clutch ring to target a second axial velocity at or about a predetermined tooth abutment position. The second axial velocity can be greater than the first axial velocity. The predetermined tooth abutment position can be an axial position of the clutch ring in which the clutch ring can be in contact with the driven member without the clutch ring axially overlapping with the driven member.

In one aspect, the present disclosure provides a rotary disconnect system for selectively coupling a drive member and a driven member. The rotary disconnect system can include a clutch ring, a solenoid actuator, a sensor, and a controller. The clutch ring can be rotationally coupled to a drive member. The solenoid actuator can be adapted to move the clutch ring between an engaged position, in which the clutch ring can be rotationally coupled to the driven member, and a disengaged position, in which the clutch ring can be rotationally decoupled from the driven member. The sensor can be configured to detect an actuation position of the solenoid actuator. The actuation position of the solenoid actuator can correlate to an axial position of the clutch ring. The controller can be in communication with the solenoid actuator and the sensor. The controller can be configured to detect the actuation position of the solenoid actuator (e.g., by the sensor), to determine a target axial velocity of the clutch ring based on the detected position of the solenoid actuator, and to provide a current command to the solenoid actuator to actuate the clutch ring toward the target axial velocity.

In one aspect, the present disclosure provides a method of controlling a rotary disconnect mechanism. The method can include operating a clutch ring, which can be supported on a drive member, to move the clutch ring between a disengaged position and an engaged position. In the disengaged position, the clutch ring can be disconnected from a driven member so that the driven member is rotationally decoupled from the drive member. In the engaged position, the clutch ring can be connected with the driven member so that the driven member is rotationally coupled with the drive member. An axial velocity of the clutch ring can be controlled based on an axial position of the clutch ring between the disengaged position and the engaged position. For example, at a first position between the between the disengaged position and the engaged position, a velocity of the clutch ring can be increased from a first (non-zero) velocity to a second (non-zero) velocity. A magnitude of the second velocity can be selected based on an axial position of the clutch ring between the disengaged position and the engaged position.

In one aspect, the present disclosure provides a method of controlling a rotary disconnect mechanism. The method can include detecting, with a position sensor, a position of a solenoid between a first position and a second position to selectively move a clutch ring axially between a disengaged position and an engaged position. In the engaged position, the clutch ring can be rotationally coupled to a driven member and in the disengaged position, the clutch ring can be disconnected from the driven member. Once the position is detected, a target axial velocity for the solenoid can be determined based on the detected position of the solenoid. A current command can be provided to the solenoid to move the pin to the target axial velocity, thereby moving the clutch ring at a corresponding axial velocity.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

FIG. 7 is a flow chart of a method of controlling the rotary disconnect system according to an actuation position of a clutch ring.

FIG. 9 is a flow chart of a method of controlling a solenoid of a rotary disconnect system to actuate a clutch ring to according to a predetermined velocity profile.

DETAILED DESCRIPTION

Figure 1A:
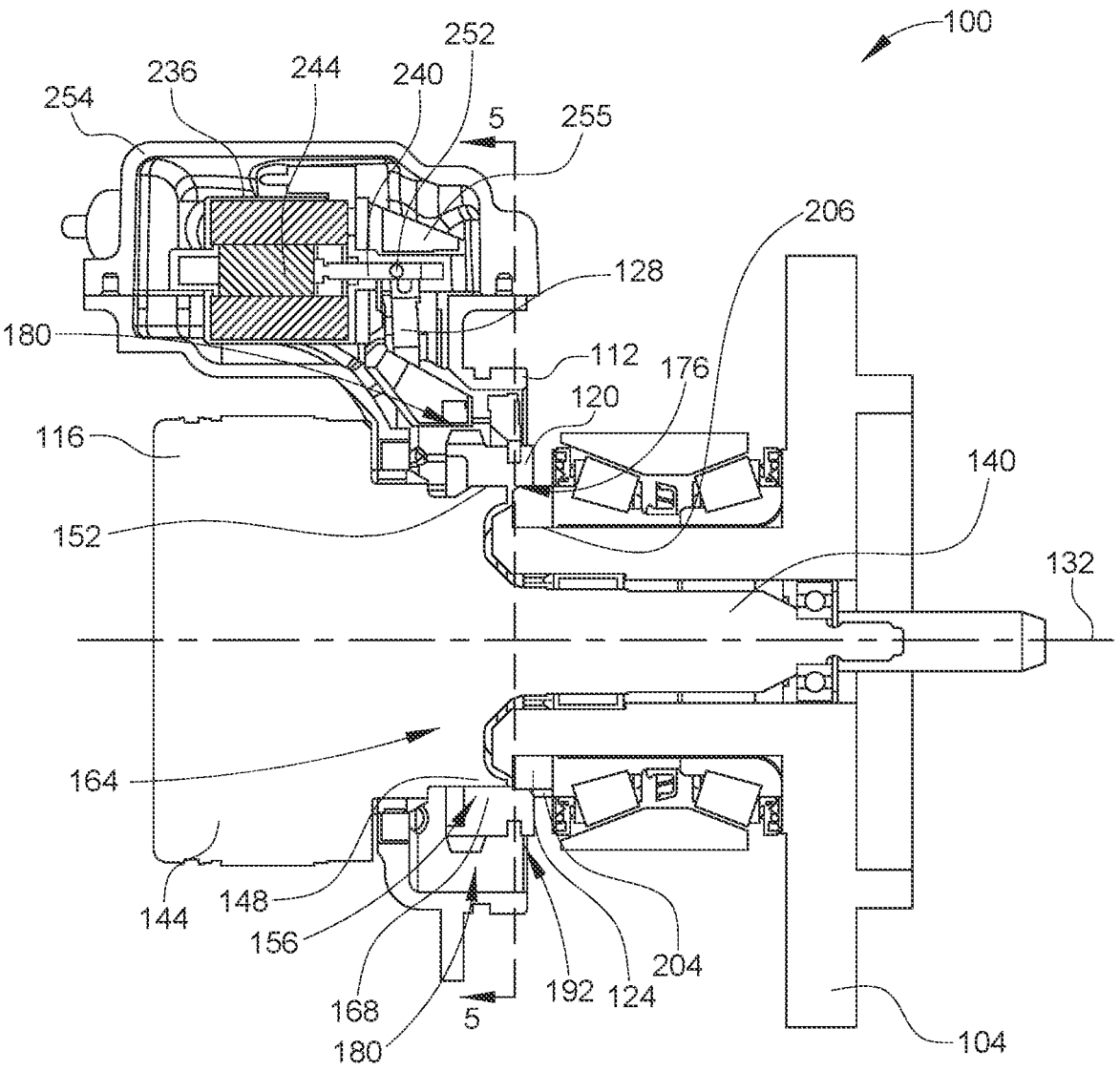
FIG. 1A is a cross-sectional view of a rotary disconnect system with a clutch ring in an engaged position according to one aspect of the present disclosure.

The use herein of the term "axial" and variations thereof refers to a direction that extends generally along an axis of symmetry, a central axis, an axis of rotation, or an elongate direction of a particular component or system. For example, axially extending features of a component may be features that extend generally along a direction that is parallel to an axis of symmetry or an elongate direction of that component. Further, for example, axially aligned components may be configured so that their axes of rotation are aligned. Similarly, the use herein of the term "radial" and variations thereof refers to directions that are generally perpendicular to a corresponding axial direction. For example, a radially extending structure of a component may generally extend at least partly along a direction that is perpendicular to a longitudinal or central axis of that component. The use herein of the term "circumferential" and variations thereof refers to a direction that extends generally around a circumference of an object or around an axis of symmetry, an axis of rotation, a central axis, or an elongate direction of a particular component or system.

The terms first, second, third, etc. may be used herein to describe various elements, components, regions, and/or positions. These elements, components, regions, and/or positions should not be limited by these terms. These terms may be only used to distinguish one element, component, region, and/or position from another element, component, region, and/or position. Terms such as "first," "second," and other numerical terms do not imply a sequence or order unless clearly indicated by the context. Thus, a first element, component, region, or position discussed below could be termed a second element, component, region, or position without departing from the teachings of the example configurations.

Generally, the present disclosure provides systems and methods for a rotary disconnect for selective coupling and disengaging of a drive member and a driven member. For example, non-limiting examples of the present disclosure may be implemented in vehicles to selectively disengage wheel hubs from a drivetrain/transmission (e.g., as a wheel-end disconnect). Non-limiting examples of the present disclosure may be particularly useful in electrically powered vehicles, but they may also be beneficial to vehicles with internal combustion engines. In some non-limiting examples, a rotary disconnect system can include a clutch ring that is configured to selectively rotationally couple a drive member to a driven member for engaging all-wheel drive or four-wheel drive. The clutch ring may be selectively moved by an actuator (e.g., a solenoid). In some non-limiting examples, the actuator may be coupled to a clutch ring by a shift member. For example, in some non-limiting examples, an actuator can be operatively coupled to a clutch ring by a shift fork. A shift fork can be pivotally coupled to a housing so that (pivotal) movement of the shift fork, as caused by actuation of the actuator, results in movement (e.g., axial translation) of the clutch ring into and out of engagement with the driven member. In some non-limiting examples, an actuator can be directly coupled to a clutch ring.

In some non-limiting examples, a rotary disconnect system can include a clutch ring that is driven by a drive member (e.g., a vehicle transmission/drivetrain). For example, the transmission may be rotationally coupled to a drive member (e.g., an axle member) by a drivetrain, and the drive member can be rotationally coupled to the clutch ring so that the clutch ring is operatively coupled to the transmission. In some non-limiting examples, a clutch ring can be a ring or gear that includes teeth that are configured to engage corresponding teeth of the axle member so that the clutch ring is rotationally coupled to the transmission. Further, in some non-limiting examples, a clutch ring can be used to selectively rotationally couple a driven member (e.g., a wheel hub) to a transmission. For example, teeth of a clutch ring (e.g., internal teeth) can be configured to selectively engage corresponding teeth (e.g., external teeth) of a driven member (e.g., a wheel hub), in response to an outside force (e.g., from an actuator/solenoid) displacing the clutch ring. In this way, the clutch ring, and thereby the transmission, can be selectively coupled to the driven member via the clutch ring. Accordingly, when the clutch ring engages the driven member, the driven member can be rotationally driven by the drive member (e.g., an axle member that is coupled to a transmission).

Furthermore, in some non-limiting examples, a clutch ring can be movable by an actuator. For example, a solenoid can be operatively coupled to the clutch ring so that activation of the solenoid can result in movement of the clutch ring. In some non-limiting examples, a shift member can operatively couple the solenoid to the clutch ring. In this way, energizing the solenoid can induce axial translation of the clutch ring, or another desired movement of the clutch ring.

Systems and methods for a disconnect for selective coupling and disconnecting of a vehicle transmission to a wheel hub according to non-limiting examples of the present disclosure can be configured to disengage all-wheel drive of a vehicle in certain operating conditions. In some instances, operating conditions may relate to internal states of a vehicle, including operating parameters of an engine or battery, operational states of implements or other work elements, etc. In some instances, operating conditions may relate to external conditions, including environmental and terrain conditions. Further, in some instances, operating conditions may relate to speed of a vehicle, including rotational speed of one or more internal components of the vehicle.

Generally, in some embodiments, indicators of any variety of operating conditions can be detected (e.g., by dedicated or general purpose sensors) and the indicators can be communicated to a controller (e.g., a general or special purpose processor having memory). In some examples, the controller can form part of a control unit on a vehicle (e.g., a transmission control unit, an engine control unit, a motor controller, a differential controller, etc.). In other examples, the controller can be a special purpose controller internal or external to the disconnect system and in communication with one or more vehicle control units.

The controller can control one or more disconnect systems to engage/disengage all-wheel drive in response to the relevant operating condition(s). For example, a vehicle may include one or more sensors that are configured to detect one or more operating conditions of one or more components of the vehicle components or of the area surrounding the vehicle (e.g., wheel speed sensor or position sensor). A controller can cause one or more disconnect systems to selectively connect a driven member (e.g., a wheel hub) to a drive member (e.g., a vehicle transmission), as selected based on the detected operating condition(s). For example, one or more sensors may be provided to monitor/detect speed of one or more components of the vehicle. In some configurations, a sensor may be an encoder that is configured to calculate or detect a rotational speed of a component having external teeth. In some non-limiting examples, one or more sensors (e.g., encoders, Hall Effect sensors, or other speed sensors) can detect a rotational speed (e.g., rpm) of a clutch ring. In response to one or more detected operating conditions, a controller may control an actuator for selectively engaging/disengaging the disconnect system.

Figure 1B:
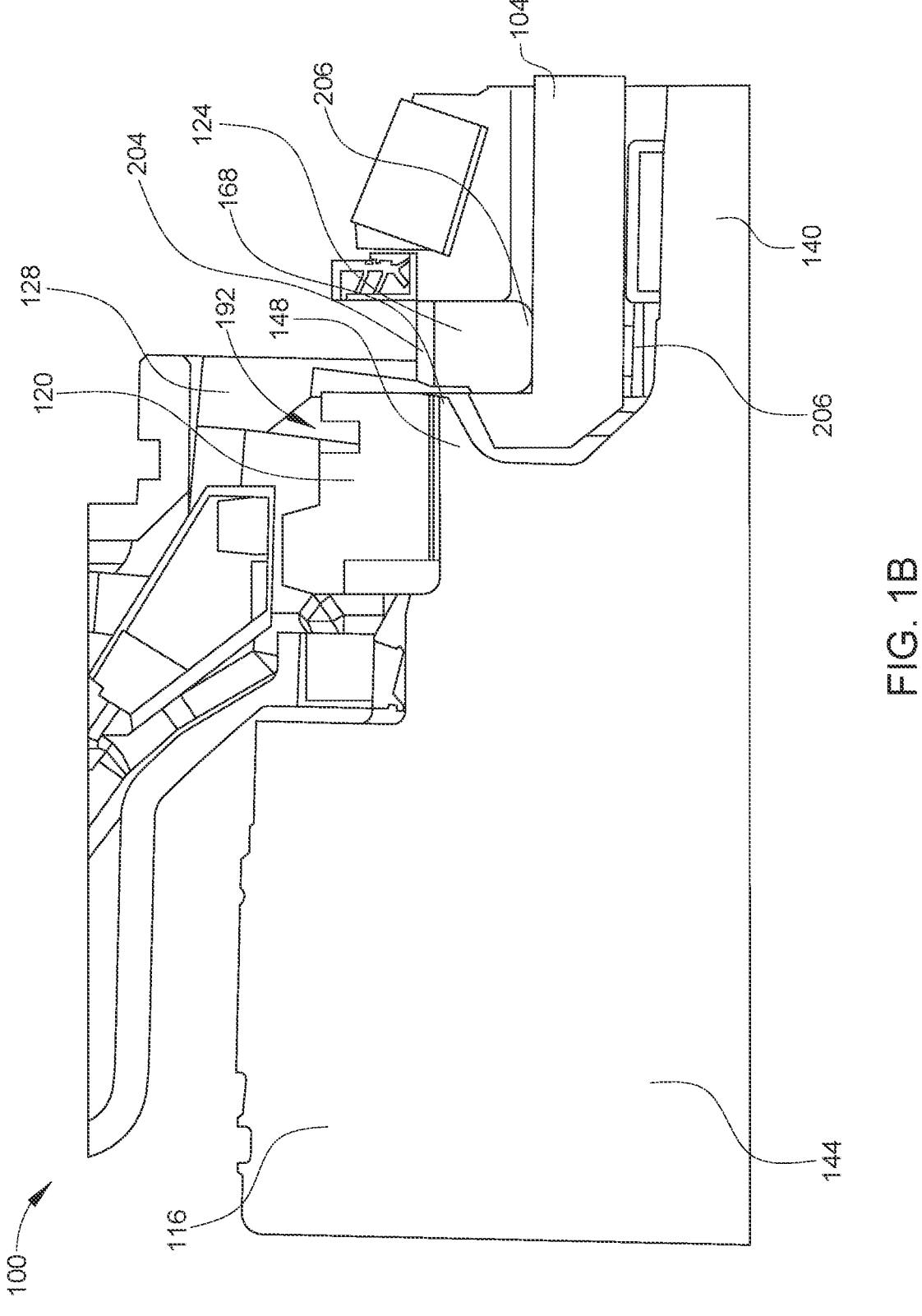
FIG. 1B is an enlarged view of a portion of the rotary disconnect system of FIG. 1A with the clutch ring in a disengaged position.

FIGS. 1A and 1B illustrate one non-limiting example of a rotary disconnect system 100 according to a non-limiting example of the present disclosure. The disconnect system 100 may be used in a vehicle to facilitate selective rotational communication between a transmission and a wheel hub. Some non-limiting examples of the present disclosure may be used to engage or disengage all-wheel drive or four-wheel drive of the vehicle within certain vehicle speed ranges. In some instances, the system may be configured to disengage all-wheel drive when conditions are detected that correspond to particular speeds.

The disconnect system 100 is illustrated with a driven member or wheel hub 104 of a vehicle that is configured to rotationally couple to a wheel (not shown). Particularly, the driven member 104 can be coupled to a wheel using known configurations (e.g., using a plurality of lug bolts or lug nuts). As discussed above, in some installations, disconnect systems according to examples of the present disclosure may be used with rear wheels of a vehicle, for example, to allow for selective engagement of the rear wheels for selective engagement or disengagement of all-wheel drive. In other installations, the disconnect systems may be used with the front wheels.

Figure 2:
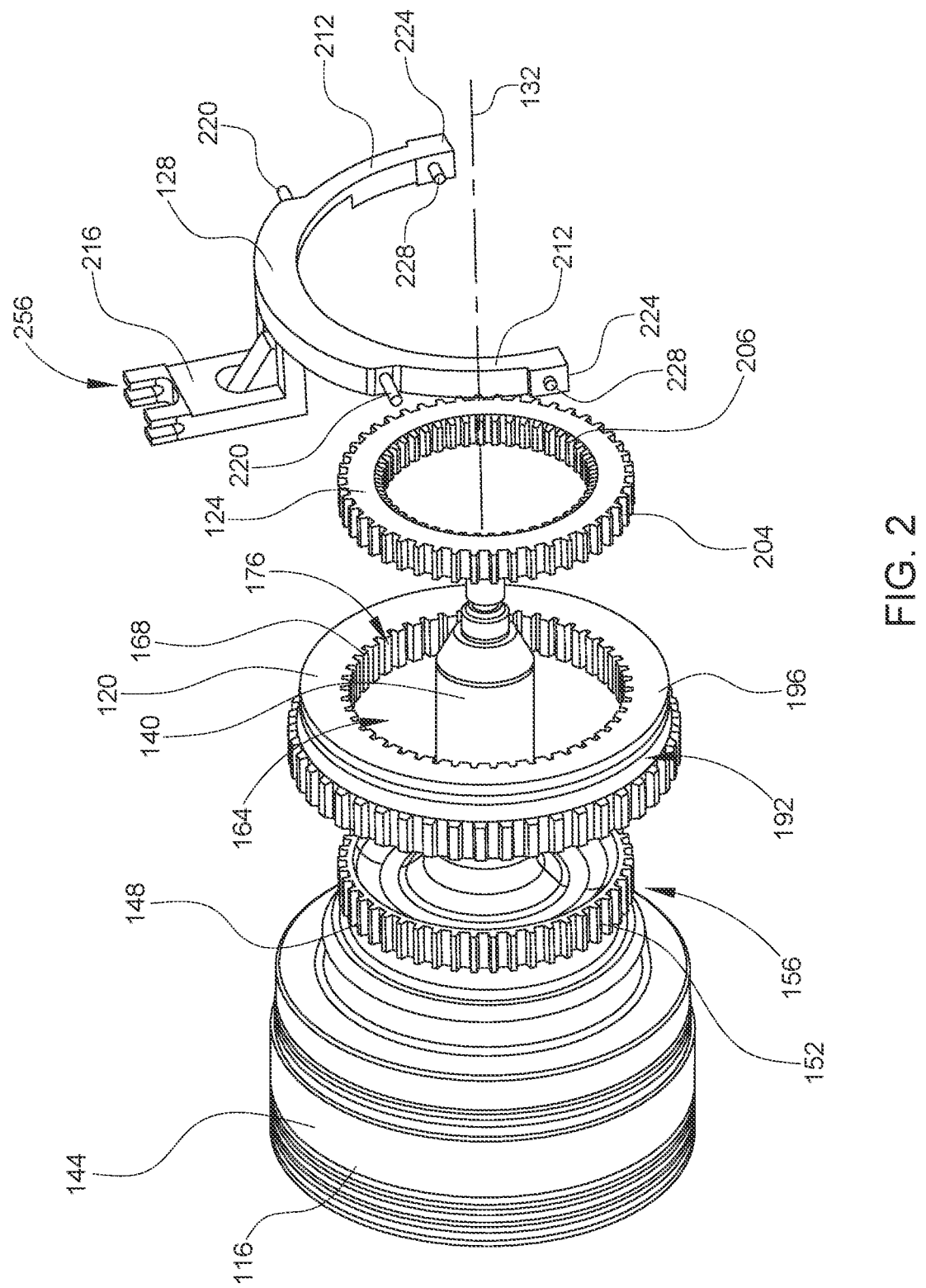
FIG. 2 is an exploded view of components included in or operable with the rotary disconnect system of FIG. 1A.

As shown in FIGS. 1A, 1B, and 2, the disconnect system 100 includes a drive member or axle member 116, a clutch ring 120, a hub gear 124 formed on or coupled to the driven member 104, and a shift fork 128. Each of the drive member 116, the clutch ring 120, and the hub gear 124 may be axially aligned along, and concentrically disposed about, a rotational axis 132 (see also FIG. 1A). The clutch ring 120 may be at least partially arranged within a housing 112, and the drive member 116 may extend axially through the housing 112. Notably, the disconnect system 100 can exclude an element for providing lost motion functionality between the actuator (e.g., the solenoid actuator 236 or another suitable type of actuator) and the clutch ring 120 as may be used in some previous approaches. An element for providing lost motion can be a single component or assembly that is configured to allow for movement in the wheel disconnect system 100 during which no useful work. Such lost motion is intended lost motion that does not include, for example, lost motion due to play or other tolerances between system components. For example, a lost motion element can be configured so that for at least a portion of a stroke of a solenoid actuator, movement of the solenoid actuator does not induce a corresponding movement of a clutch ring. Accordingly, by not including a lost motion component in the disconnect system 100, each movement of a solenoid actuator can induce a corresponding movement of the clutch ring 120.

Figure 3:
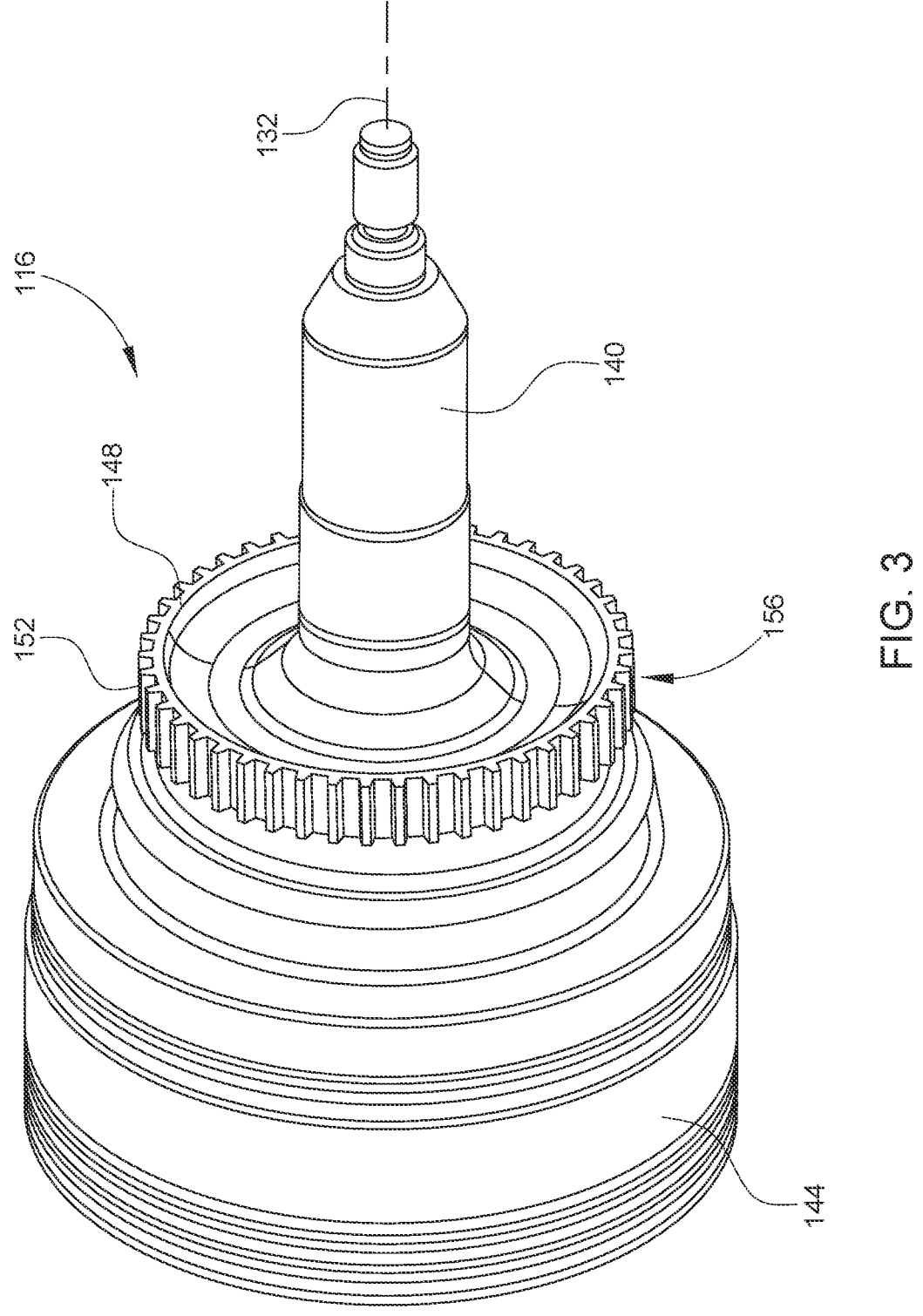
FIG. 3 is a perspective view of a shaft member of the rotary disconnect system of FIG. 1A.

The drive member 116 is shown in detail in FIG. 3. The drive member 116 may alternatively be referred to herein as a half shaft or an axle member and is generally configured to be rotationally driven by a transmission (not shown) of a vehicle. In some installations, a transmission may be a transmission of an electric vehicle, but a transmission in other installations may be of a vehicle with an internal combustion engine or a hybrid vehicle. In some installations, the half shaft or axle member can be configured to be rotationally driven by an electric drive machine or electric drive unit including an electric motor, an inverter, and a gear reduction. The drive member 116 is configured to rotate with the transmission, which is driven by the vehicle's power source (e.g., an electric motor or an internal combustion engine). As shown, the drive member 116 is a unitary component that includes an elongate axle portion 140 extending from a base portion 144. The drive member 116 includes an intermediate portion 148 that is disposed between the base portion 144 and the elongate axle portion 140. A diameter of the intermediate portion 148 is between the diameter of the base portion 144 and the diameter of the elongate axle portion 140. In the illustrated non-limiting example, the intermediate portion 148 includes external gear teeth 152 on an external surface 156 thereof.

As shown in FIG. 2, the drive member 116 is configured to couple to the clutch ring 120 so that the clutch ring 120 of the disconnect system 100 according to the present non-limiting example is disposed between the base portion 144 of the drive member 116 and the driven member 104 (see FIG. 1A). The clutch ring 120 is generally provided to selectively couple and disconnect the drive member 116 and the driven member 104 (see, e.g., FIG. 1A), which will be described in greater detail below.

Figure 4:
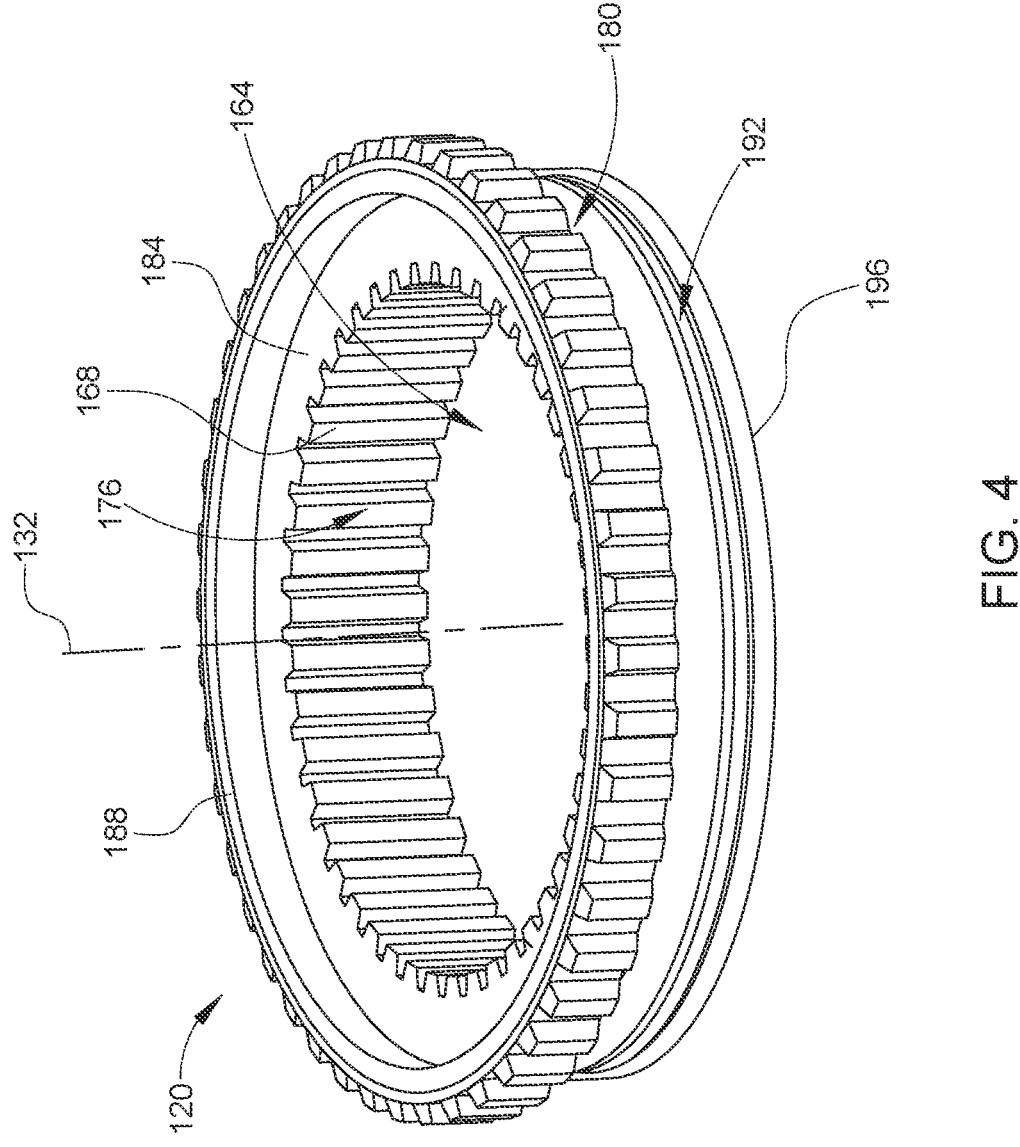
FIG. 4 is a perspective view of a clutch ring of the rotary disconnect system of FIG. 1A.

FIG. 4 illustrates the clutch ring 120 in detail. As illustrated, the clutch ring 120 is an annular member that defines a central opening 164 and is geared having internal gear teeth 168. The internal teeth 168 are disposed circumferentially around an inner surface 176 of the clutch ring 120. The clutch ring 120 further includes an internal step 184 that is disposed between the inner surface 176 and a first end 188 of the clutch ring 120. Further, the clutch ring 120 defines a channel 192 that is radially recessed into and circumferentially extends along the clutch ring 120 proximate an opposing second end 196 of the clutch ring 120.

Returning to FIG. 2, the internal teeth 168 of the clutch ring 120 are configured to mesh and engage with the external teeth 152 of the intermediate portion 148 of the drive member 116 to rotationally couple the clutch ring 120 to the drive member 116. The internal teeth 168 of the clutch ring 120 may be further configured to couple the drive member 116 to the driven member 104, upon selective axial translation of the clutch ring 120 (e.g., relative to the rotational axis 132). In the illustrated non-limiting example, for example, the internal teeth 168 of the clutch ring 120 are configured to mesh and engage with external teeth 204 of the hub gear 124, which is coupled to the driven member 104 for rotation therewith. In some non-limiting examples, the hub gear 124 may be integrally formed with the driven member 104.

As discussed above, the clutch ring 120 can be configured to selectively rotationally couple the drive member 116 to the driven member 104 to transition the disconnect system 100 between an engaged configuration with the clutch ring 120 in an engaged position and a disengaged configuration with the clutch ring 120 in a disengaged position. That is, the clutch ring 120 can be configured to move between an engaged position (FIG. 1A) and a disengaged position (FIG.

1B). The engaged configuration, for example, may provide four-wheel drive or all-wheel drive (for four-wheeled vehicles), whereas the disengaged configuration may provide two-wheel drive (e.g., front-wheel drive or rear-wheel drive).

The clutch ring 120 is rotationally coupled to the drive member 116, and when the clutch ring 120 is in the engaged position, the clutch ring 120 is rotationally coupled to the driven member 104. When the clutch ring 120 is in the disengaged position, the clutch ring 120 is disconnected from (e.g., rotationally decoupled from) the driven member 104. In the illustrated non-limiting example, as shown in FIG. 1A, axial translation of the clutch ring 120 in a first direction (e.g., towards the hub gear 124) engages the external teeth 204 of the hub gear 124 with the internal teeth 168 of the clutch ring 120, which is coupled to the drive member 116 through engagement with the external teeth 152. As such, rotation of the drive member 116, e.g., via the transmission, results in corresponding rotation of the driven member 104 through the rotational coupling provided by the clutch ring 120. In other words, in the engaged position, the clutch ring 120 is in an axial position where the internal teeth 168 of the clutch ring 120 are meshed and in engagement with both the external teeth 152 of the drive member 116 and the external teeth 204 of the hub gear 124, which is coupled to the wheel hub 104. In other words, the clutch ring 120 axially overlaps a portion of the external teeth of the drive member 116 and a portion of the external teeth 204 of the hub gear 124 of the wheel hub 104. This arrangement of the clutch ring 120 (e.g., the engaged configuration) rotationally couples the drive member 116 to the driven member 104.

In the disengaged configuration, as shown in FIG. 1B, the clutch ring 120 may be axially translated in a second direction (e.g., displaced away from the hub gear 124) so that the internal teeth 168 of the clutch ring 120 move out of engagement with the external teeth 204 of the hub gear 124. As such, in the disengaged configuration the clutch ring 120 decouples the drive member 116 from the hub gear 124, and thereby the driven member 104. Consequently, rotation of the drive member 116 induced by the transmission would not determine or control rotation of the driven member 104. In this configuration, the driven member 104 may be allowed to freely rotate independent of the rotation of the drive member 116 (e.g., rotation of the driven member 104 may be caused by contact between a road surface and a wheel coupled to the driven member 104).

Figure 5:
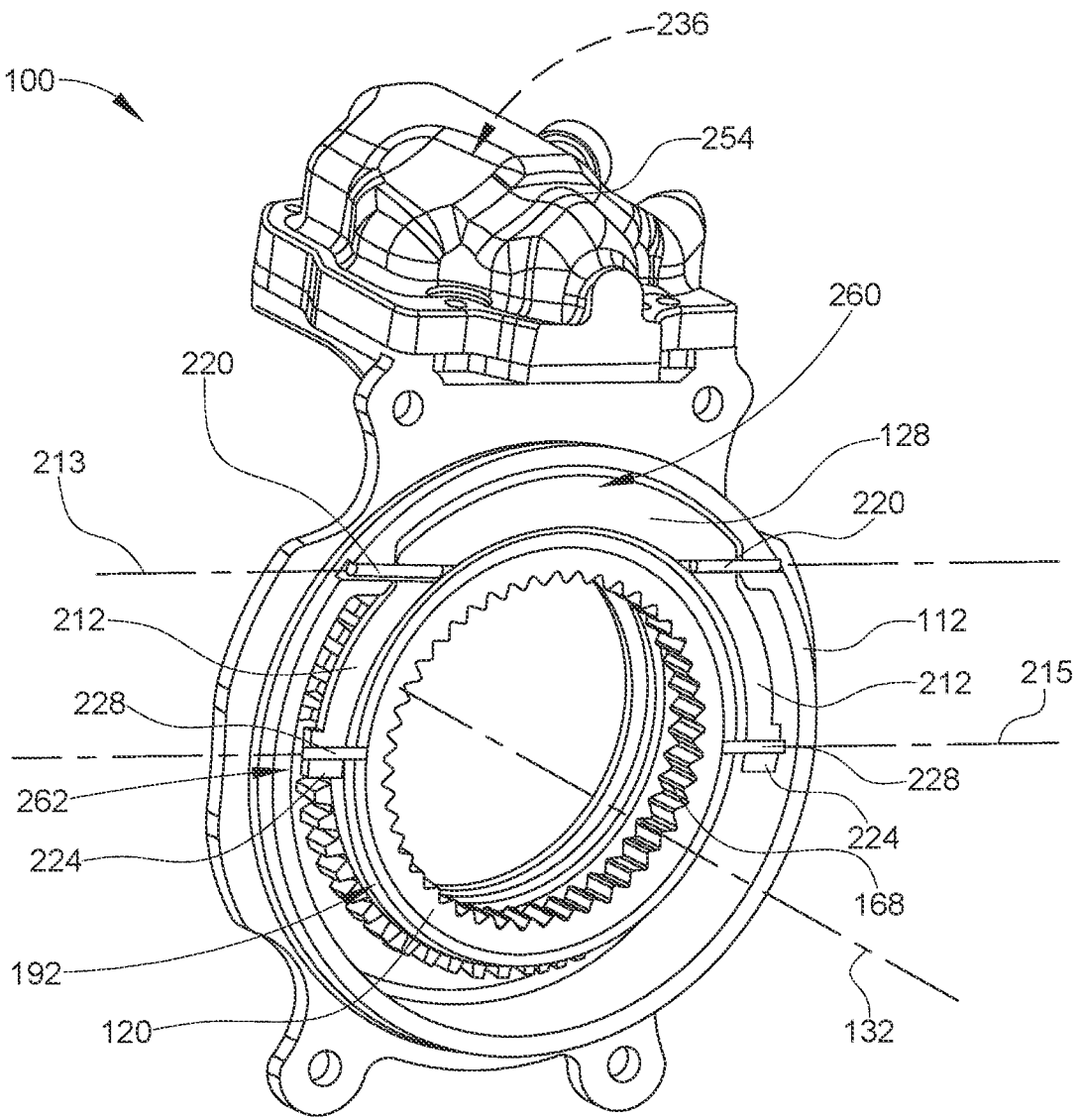
FIG. 5 is a cross-sectional view of the rotary disconnect system of FIG. 1A taken along line 5-5.

In general, with reference to FIGS. 1A, 2, and 5, the shift fork 128 and an actuator or solenoid actuator 236 may control the selective movement (e.g., axial translation) of the clutch ring 120 between the engaged configuration (e.g., an engaged position) and the disengaged configuration (e.g., a disengaged position), and any position between the engaged position and the disengaged position. For example, as shown in FIG. 2, the shift fork 128 includes two, opposing shift arms 212 that extend from a body 216 along a common curved path. The shift fork 128 may be at least partially arranged within the housing 112. The shift arms 212 are arranged radially outside of the clutch ring 120 (see FIG. 5). The clutch ring 120 is generally configured to be pivotally attached to a portion of the housing 112 via pins 220. The pins 220 may establish a fixed attachment point for the shift fork 128 to pivot about. The pins 220 define a first pivot axis 213 that is transverse to the rotational axis 132 (see FIG. 5), and the shift fork 128 pivots relative to the housing 112 about the first pivot axis 213. In the illustrated embodiment, the first pivot axis 213 is offset from the rotational axis 132

(e.g., radially offset from the perspective of the rotational axis 132), such that the first pivot axis 213 does not intersect with the rotational axis 132.

The shift fork 128 can be coupled to the clutch ring 120 at distal ends 224 of the shift arms 212 of the shift fork 128. For example, the channel 192 of the clutch ring 120, which extends substantially circumferentially along the clutch ring 120 about the rotational axis 132, can be configured to receive internal pins 228 extending radially inward and disposed proximate the distal ends 224 of the shift fork 128. The internal pins can define a second pivot axis 215 that is transverse to the rotational axis 132 (see FIG. 5), and radially offset from the first pivot axis 213 such that the first pivot axis is parallel to the second pivot axis 215. The second pivot axis 215 intersects with the rotational axis 132. The shift fork 128 pivots relative to the clutch ring 120 about the second pivot axis 215. Accordingly, pivotal movement of the shift fork 128 about the first pivot axis 213 can result in axial movement of the clutch ring 120 along the rotational axis 132 by engagement between the shift fork 128 and the clutch ring 120 at the second pivot axis 215.

Furthermore, non-limiting examples of the present disclosure can include an actuator for engaging and disengaging a clutch ring with a wheel hub (e.g., by actuating/moving a shift fork). For example, as shown in FIG. 1A, the disconnect system 100 according to the present non-limiting example includes an actuator configured as a solenoid actuator 236, which is configured to actuate, e.g., pivot, the shift fork 128 to axially translate the clutch ring 120 between engaged and disengaged positions. The solenoid actuator 236 is arranged within a housing cover 254 coupled to the housing 112. In some non-limiting examples, the solenoid actuator 236 may be a bi-stable solenoid having two stable operating positions (e.g., positions of an armature 244 that the solenoid actuator 236 may maintain without power being provided to the solenoid actuator 236). For example, the solenoid actuator 236 can move a pin 240 between an extended position and a retracted position. The solenoid actuator 236 includes the pin 240 that extends from an armature 244 of the solenoid actuator 236 that is configured to move with the armature 244 between the extended position and the retracted position via selective energization of the solenoid actuator 236. For example, a direction or polarity of a current supplied to the solenoid actuator 236 may determine the actuation configuration (e.g., extended position or retracted position) of the pin 240. In the illustrated non-limiting example, the solenoid actuator 236 can include one or more wire coils, a permanent magnet, one or more pole pieces, and in some examples, a spring in order to provide the bi-stable functionality.

In operation, a wire coil of the bi-stable solenoid actuator 236 may be selectively energized, i.e., supplied with a current in a desired direction at a predetermined magnitude. In response to the current being applied to the wire coil, the armature 244, and thereby the pin 240, can move between two stable positions (e.g., the retracted and extended positions) depending on the direction of the current applied to the wire coil. In some non-limiting examples, the armature 244 may be in a first armature position corresponding to the retracted position and the wire coil of the solenoid actuator 236 may be energized with a current in a first direction. The armature 244 may then fully shift (i.e., actuate) to a second armature position corresponding to the extended position and the wire coil may be de-energized (i.e., the current is removed). The armature 244 will remain in the second armature position until the wire coil is energized with a current in a second direction opposite to the first direction.

The armature 244 may then fully shift back to the first armature position and the wire coil may be de-energized. In this way, the operation of the solenoid actuator 236 may require a reduced energy input because the wire coil is not required to be continuously energized.

The bi-stability of the solenoid actuator 236 allows the clutch ring 120 to be maintained in an engaged or a disengaged position without the need for power to be applied to the wire coil. That is, by maintaining a position of the shift fork 128 that is engageable by the solenoid actuator 236 via the pin 240, a position of the clutch ring 120 can be maintained. Further, the ability to apply bi-directional force with a bi-stable solenoid actuator can allow for improved controllability, while also eliminating the need for additional biasing elements (e.g., springs). In other non-limiting examples, a mono-stable solenoid actuator could be utilized (e.g., a peak-and-hold solenoid), which would require constant power to maintain the clutch ring 120 in a desired position (e.g., an engaged position), but would return to a default state (e.g., a disengaged position) in the event of power loss.

In the illustrated non-limiting example, the disconnect system 100 can include a sensor 255 configured to detect an axial position of the clutch ring 120. For example, the sensor 255 can be configured to detect an axial position of the clutch ring 120, or a position or orientation of the solenoid 236 or a structure actuatable by the solenoid 236, which can be correlated to the detected axial position of the clutch ring 120. Accordingly, it is appreciated that the detected axial position of the clutch ring 120 can be an approximate axial position of the clutch ring 120 due to manufacturing tolerances and any compliance of the corresponding actuating structures or solenoid actuator 236.

In the illustrated non-limiting example, the sensor 255 may be arranged adjacent to the pin 240 of the solenoid actuator 236. The sensor 255 is configured to detect a position of the pin 240 (see, e.g., FIG. 1A), which is in engagement with the shift fork 128 that axially translates the clutch ring 120. As such, the position of the pin 240 can be correlated to the position of the clutch ring 120. The sensor 255 can be a Hall Effect sensor, such that the position of the pin 240 can be detected in the retracted position, the extended position, and any position between the retracted and extended positions. In other non-limiting examples, other pin detection systems can be used. For example, a current or voltage applied to the wire coil of the solenoid actuator 236 can be correlated to a position of the pin 240.

As described herein, the position of the pin 240 may be directly correlated to a position of the shift fork 128 and, thereby, the position of the clutch ring 120. Accordingly, the sensor 255 may be arranged to sense a configuration of the solenoid actuator 236 (e.g., a position of the pin 240) in either the extended configuration or the retracted configuration, which corresponds with sensing a position of the clutch ring 120 in either an engaged position or a disengaged position. Integrating the sensor 255 into the disconnect system 100 enables the position of the clutch ring 120 to be actively detected and output, for example, to a controller (see, e.g., controller 272, FIG. 6). Conventional disconnect systems often include a spring or another biasing element between the actuator input and the clutch ring. In these conventional configurations, the position of the actuator is not directly correlated to the position of the clutch ring, because of the intermediate spring, so sensing the position of the actuator only provides an output that is indicative of the state of the actuator, not the position of the clutch ring. The disconnect system 100 solves this problem by providing the sensor 255 and utilizing an actuating linkage between the pin 240 and the clutch ring 120 (i.e., the shift fork 128) that results in direct movement of the clutch ring 120 upon movement of the pin 240.

The solenoid actuator 236 is coupled to the shift fork 128 so that the solenoid actuator 236 can control movement of the shift fork 128. For example, as shown in FIG. 1A, the pin 240 is coupled to the shift fork 128 via attachment points 252 that extend from the pin 240. In the illustrated example, the attachment points 252 can be configured as pins to be received by slots 256 (see, e.g., FIG. 2) defined by the body 216 of the shift fork 128. Accordingly, when assembled, movement of the pin 240 by the solenoid actuator 236 can result movement of the shift fork 128 at attachment points 252, resulting in pivotal movement of the shift fork 128 about the first pivot axis 213 (see FIG. 5). More specifically, referring to FIG. 5, when the solenoid actuator 236 actuates, a first end 260 of the shift fork 128, e.g., the body 216 (see, e.g., FIG. 2) moves in a first direction, thereby pivoting the shift fork 128 about the pins 220. Accordingly, as the first end 260 of the shift fork 128 moves in the first direction, a second end 262, e.g., the distal ends 224, move in a second direction about the pins 220, the second direction being opposite the first direction. Movement of the second end 262 of the shift fork 128 results in axial translation of the clutch ring 120, via the coupling between the shift fork 128 and the clutch ring 120 provided by the internal pins 228, between the engaged position and the disengaged position.

Figure 6:
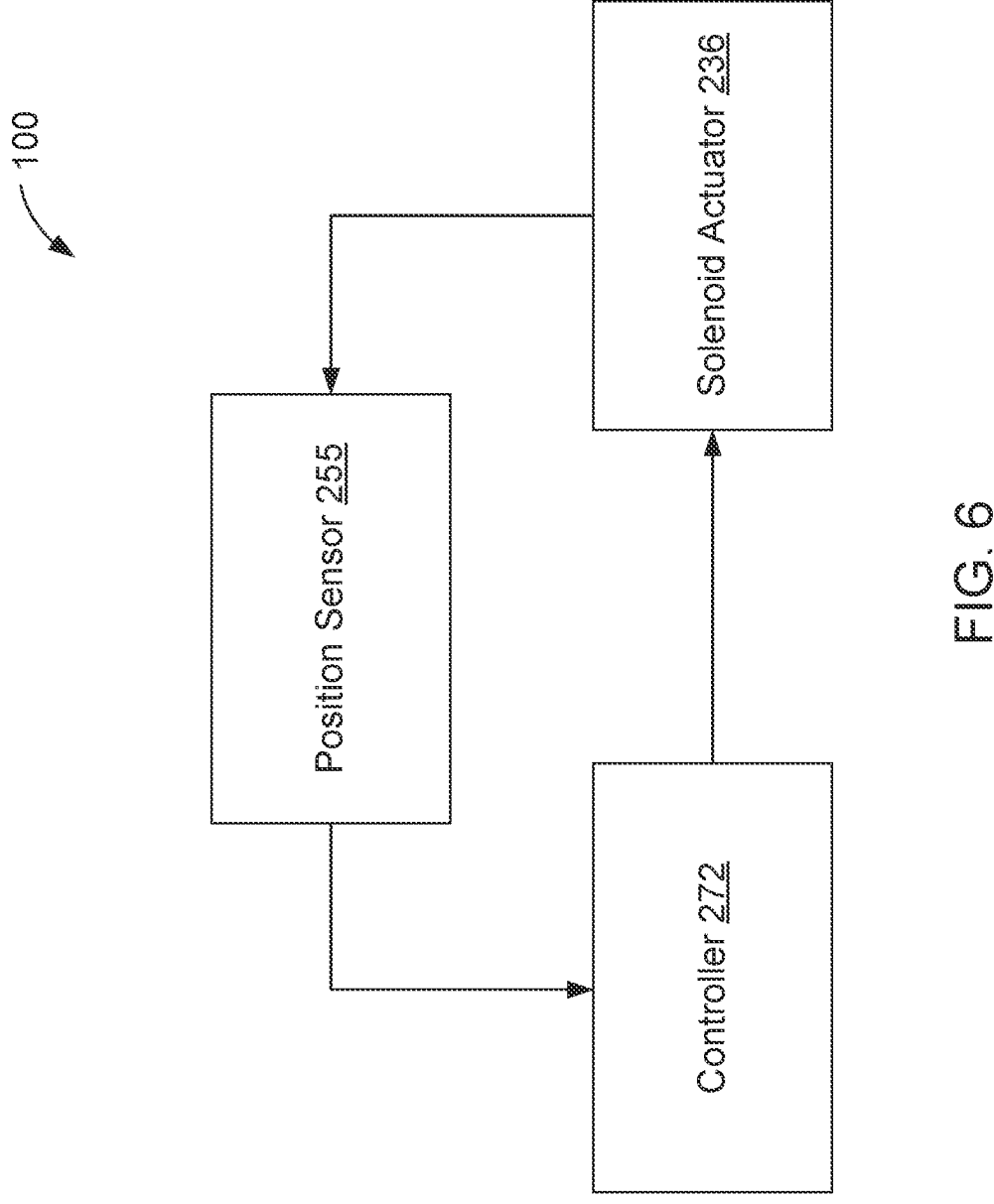
FIG. 6 is a schematic illustration of components of the rotary disconnect system of FIG. 1A.

As discussed above, systems according to non-limiting examples of the present disclosure can be configured to engage and/or disengage all-wheel drive of a vehicle in response to particular operating conditions. For example, FIG. 6 illustrates a schematic representation of components of the disconnect system 100 shown in FIGS. 1A and 2. As illustrated, the disconnect system 100 can include a controller 272 that is configured to send control signal to components of the disconnect system 100 in response to received signals. For example, the sensor 255 can send information to the controller 272 indicating one or more particular operating conditions, e.g., a position of the clutch ring 120. In response to the detected operating condition, the controller 272 can actuate the solenoid actuator 236 to move the clutch ring 120, thereby controlling engagement or disengagement of the drive member with the driven member. For example, the solenoid actuator 236 may be configured to selectively transition the clutch ring 120 between the engaged position and the disengaged position based on an axial position of the clutch ring 120 (e.g., by correlation with a position of the solenoid actuator 236, or by correlation with a position of the pin 240, which is sensed or detected by the sensor 255). The position of the clutch ring 120 can be communicated to the controller 272.

The controller 272 is configured to control the shifting of the disconnect system 100 (e.g., a clutch ring, a solenoid) between engaged and disengaged configurations. The disconnect system 100 can shift between those configurations in response to one or more operating condition(s) that can be detected by one or more sensors (e.g., the sensor 255 or another sensor). In response to one or more detected operating conditions (e.g., position of the clutch ring 120, or another operating condition, such as, a rotational speed, torque, axial velocity of shifting components, etc.), the controller 272 may control the solenoid actuator 236 for selectively engaging/disengaging the disconnect system 100. The controller 272 can execute a variety of control schemes for the rotary disconnect system 100, such a proportional integral (PI) control schemes and other suitable control schemes.

In conventional forms of control, a controller for a disconnect system can provide a constant current command to a solenoid actuator. The constant command may result in varying degrees of dissatisfaction and performance of the disconnect system. For example, if the command is too high, noise vibration, and harshness ("NVH") can increase to a level that is undesirable to a user of the disconnect system due to the axial velocity of the shifting clutch ring (e.g., relative to a rotational axis thereof) being too high. Conversely, if the current command is too low, a clutch ring of the disconnect system may not reliably transition into the engaged position due to the clutch ring "bouncing" or "ratcheting" off of the face of a mating gear (e.g., a hub gear/driven member) due to the actuation force being too low. As a result, reliability issues may persist when using conventional control methods (e.g., failing to achieve full engagement between the gears, becoming torque trapped, etc.), which can reduce the performance of a disconnect system.

The present disclosure provides systems and methods for commanding a solenoid to shift a clutch ring at a target axial velocity based on an axial position of the clutch ring. In some non-limiting examples, the command can vary based on the axial position of the clutch ring to control (e.g., increase or decrease) the axial velocity thereof. This method of controlling the axial velocity of the clutch ring, particularly at various axial positions in the axial travel of the clutch ring, can diminish the drawbacks noted above (e.g., NVH, torque trapping, bouncing off the mating gear, failing to achieve full engagement between the gears, undesirable NVH, etc.).

With reference to FIG. 6, the controller 272 is in communication with a sensor 255 and a solenoid actuator 236. In operation, the sensor 255 detects an axial position of the clutch ring 120 (relative to the rotational axis 132 thereof, see FIG. 2) and the controller 272 is configured to control the axial velocity of the clutch ring 120 (relative to the rotational axis 132) by adjusting the current command to the solenoid actuator 236 as a function of the axial position of the clutch ring 120. As will be described herein, methods are provided for controlling the axial velocity of the clutch ring 120 during the shift between the engaged position and the disengaged position to reduce the aforementioned drawbacks. For example, an axial velocity of the clutch ring 120 can be correlated to NVH, and thus, there is a need to be below an axial velocity threshold, particularly at the point of engagement between the clutch ring 120 and the driven member 104, to reduce NVH. However, there is also a need to quickly switch between states which requires a fast axial velocity (e.g., relative to the axial velocity threshold) of the clutch ring 120. The controller 272 of the present disclosure provides fast actuation of the clutch ring 120 while reducing excess NVH by adjusting the axial velocity of the clutch ring 120 based on the axial position thereof.

Referring now to FIG. 7, a non-limiting example for a method 500 of controlling the rotary disconnect mechanism 100 based on the axial position of the clutch ring 120 is illustrated. At process block 510, the controller 272 can detect an axial position of the clutch ring 120, for example, by detecting a position of the solenoid actuator 236, which can be correlated to an axial position of the clutch ring 120. In some non-limiting examples, the axial position of the clutch ring 120 can be determined in other ways, for example, by directly measuring a position of the clutch ring

120, or by correlating a position of another component with the position of the clutch ring 120, for example, by using the sensor 255 to determine a position of the pin 240. At process block 520, the controller 272 can determine a target axial velocity the solenoid actuator 236 and/or the clutch ring 120 based on the detected position of the solenoid actuator 236 or, by correlation, the clutch ring 120. According to one non-limiting example, the target axial velocity can be defined by a predetermined velocity profile (see, e.g., FIG. 10). The velocity profile can include a constant or varying target axial velocity based on the position of the solenoid actuator 236 and/or the position of the clutch ring 120. According to one non-limiting example, the target axial velocity can be determined by referring to the predetermined velocity profile, which can be stored in the controller 272 (e.g., on a memory).

At process block 530, the controller 272 can output a command (e.g., an excitation command, such as a voltage command or a current command) to the solenoid actuator 236 to drive the solenoid actuator 236, and thereby the clutch ring 120, toward the target axial velocity. In some non-limiting examples, the controller 272 can implement a closed loop control strategy to measure the actual axial velocity of the solenoid actuator 236/clutch ring 120 (e.g., by a derivative of the signal from the sensor 255), and compare that measured axial velocity with the target axial velocity to control the axial velocity of the solenoid actuator 236 toward the target axial velocity, thereby moving the clutch ring 120 at a corresponding axial velocity.

In some non-limiting examples, the method 500 of controlling the rotary disconnect mechanism 100 based on the axial position of the clutch ring 120 can be performed continuously. For example, the position of the solenoid actuator 236 (e.g., the clutch ring 120) can be continuously sampled at process block 510 (e.g., at one or more sampling frequencies). Accordingly, determination of the target axial velocity at process block 52 and corresponding output command at process block 530 can be continuously adjusted in accordance with a current position of the solenoid actuator 236 and/or clutch ring 120.

Figure 8A:
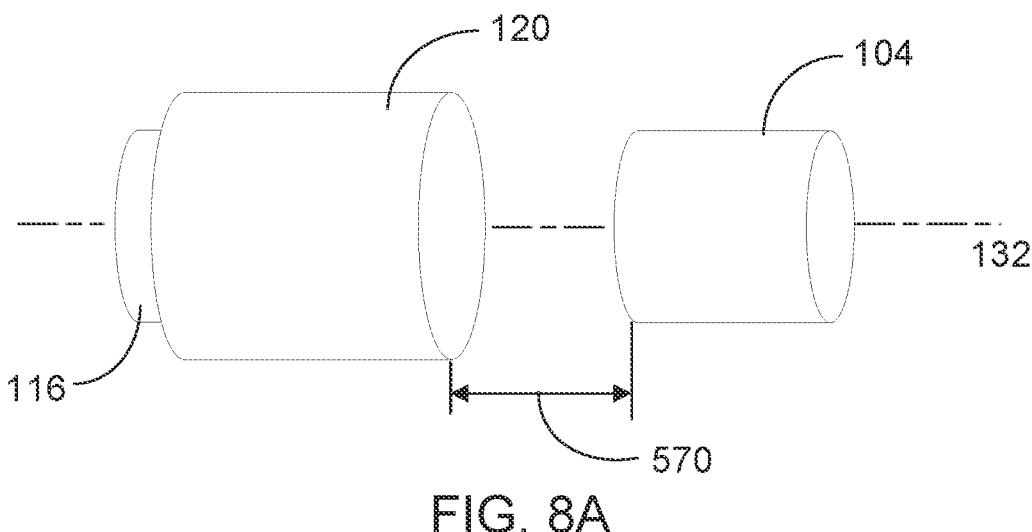
FIGS. 8A-8C are schematic illustrations of a clutch ring of the rotary disconnect system at various positions, including a tooth abutment position.
Figure 8B:
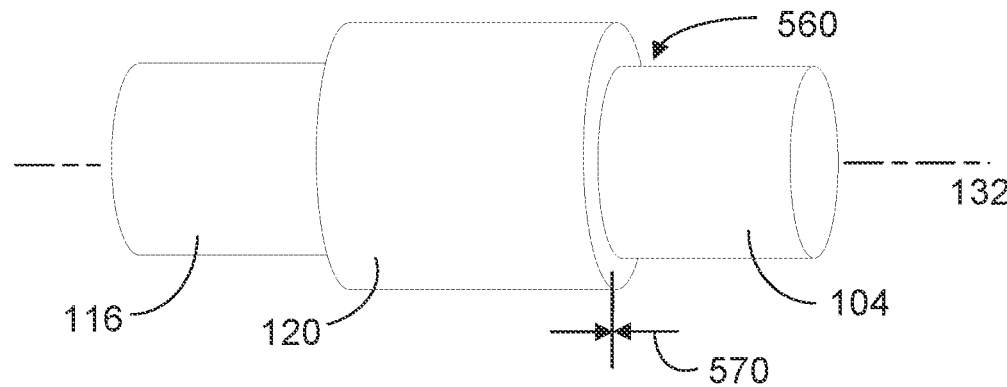
Figure 8C:
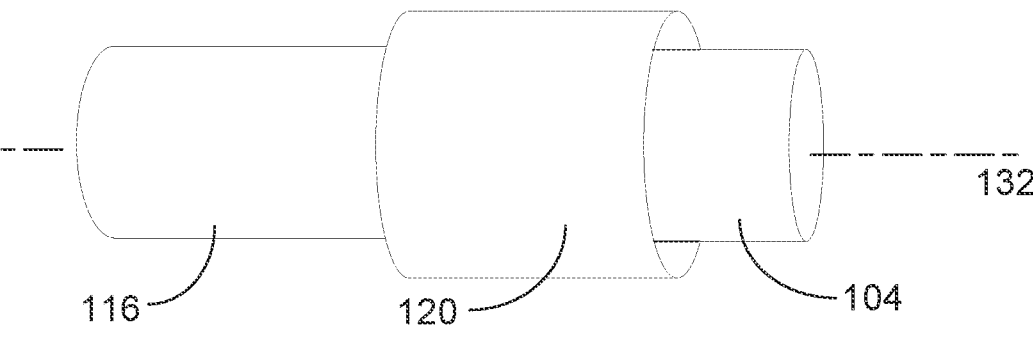

Referring now to FIGS. 8A-8C, the clutch ring 120 is illustrated in a disengaged position (FIG. 8A), a tooth abutment position (FIG. 8B), and an engaged position (FIG. 8C). The tooth abutment position 560 is an axial position of the clutch ring 120 where the clutch ring 120 contacts but is rotationally decoupled from the driven member 104 (e.g., the external teeth 204, or the face, of the hub gear 124 contact the driven member 104) and/or when no axial gap exists between the clutch ring 120 and the driven member 104 (e.g., immediately prior to contact between the clutch ring 120 and the driven member 104). Referring to FIG. 8A, an axial gap 570 is defined between the clutch ring 120 and the driven member 104 disposed coaxially about a rotational axis 132. Referring to FIG. 8B, the axial gap 570 is no longer present as the clutch ring 120 moves into contact with the driven member 104. Referring to FIG. 8C, the clutch ring 120 is in the engaged position, in which the clutch ring 120 axially overlaps with the driven member 104.

Figure 10:
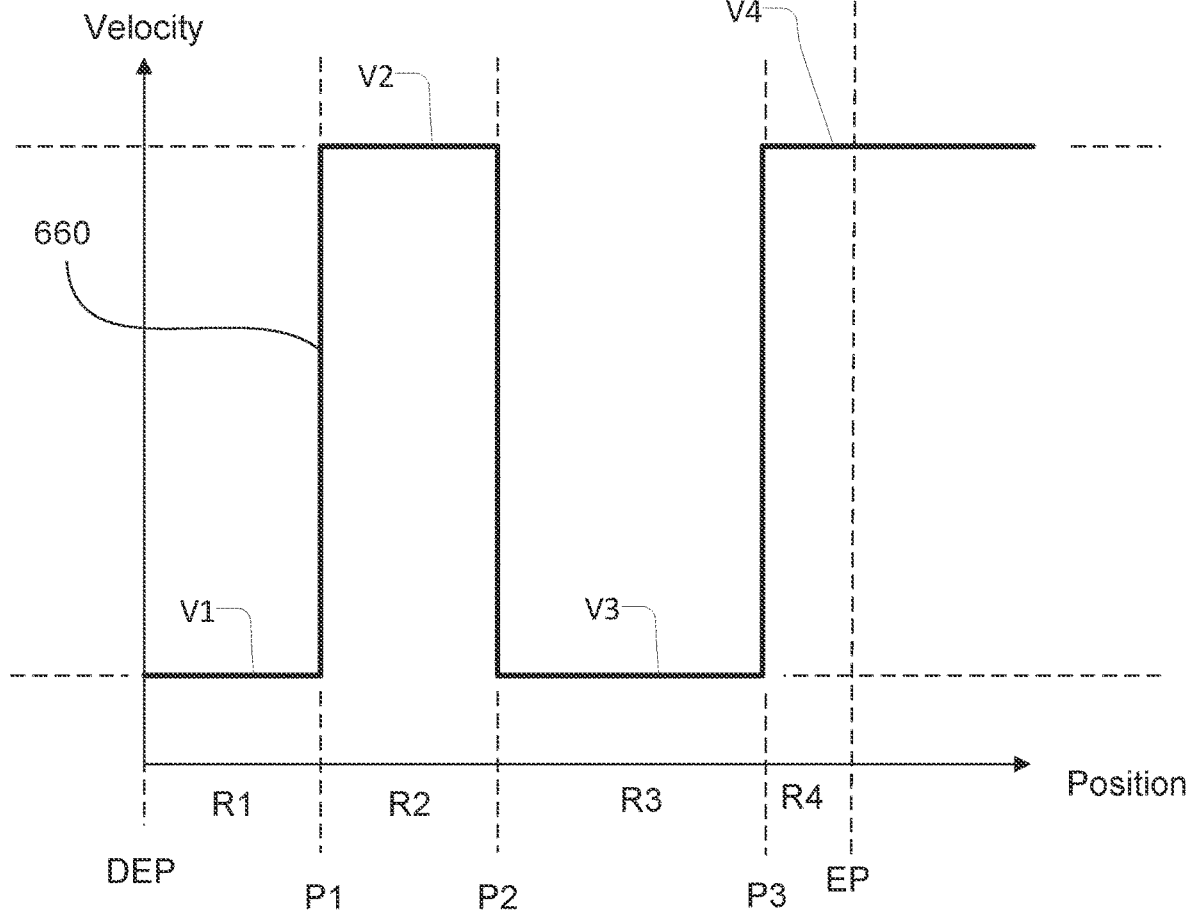
FIG. 10 is a schematic illustration of a velocity profile.

As described herein, the axial velocity of the clutch ring 120 can be controlled based on the axial position of the clutch ring 120. FIGS. 9 and 10 depict a method 600 of controlling the axial velocity of the clutch ring 120 between the disengaged and engaged positions according to a non-limiting example of a velocity profile 660 (FIG. 10). Referring to FIGS. 9 and 10, at process block 610, the controller 272 can command the solenoid actuator 236 to actuate the clutch ring 120 to target a first axial velocity V1 from the disengaged position toward the engaged position.

At process block 620, the controller 272 can command the solenoid actuator 236 to actuate the clutch ring 120 to target a second axial velocity V2 at or about the tooth abutment position 560 (e.g., immediately prior to the tooth abutment position). The particular distance from the tooth abutment position 560 at which the controller 272 commands the solenoid actuator 236 to increase to the second axial velocity V2 can vary depending on the particular application, for example, as may account for part sizes, manufacturing tolerances, error in the sensor 255, response delay in the solenoid actuator 236, etc. In any case, the position at which the controller 272 commands the solenoid actuator 236 to increase to the second axial velocity V2 can be selected so as to balance the force applied to the clutch ring 120 with the velocity of the clutch ring 120.

That is, increasing velocity can result in greater noise and vibration during engagement, but can also increase the applied force to prevent the clutch ring 120 from bouncing off of the driven member 104 or to hold the clutch ring 120 at the tooth abutment position 560 until it can engage with the driven member 104. As such, the position can be selected so as to provide sufficient force to ensure engagement while also minimizing the velocity to reduce noise and vibration. In some non-limiting examples, the controller 272 can command the solenoid actuator 236 to increase the second axial velocity V2 within about 10 mm, 5 mm, 2 mm, 1 mm, 0.5 mm, or 0.25 mm of the tooth abutment position 560. However, as mentioned above the particular distance can vary and can also be greater than 10 mm or less than 0.25 mm. As a result, in some cases, the velocity of the clutch ring 120 can be between the first axial velocity V1 and the second axial velocity V2 at engagement. Further, in some cases, it is possible that the clutch ring 120 does not reach the second axial velocity V2 but may still accelerate through the tooth abutment position 560, which can contribute to the increased forces.

In some non-limiting examples, the controller 272 can actuate the clutch ring 120 to maintain the second axial velocity V2 to the engaged position. In other non-limiting examples, the controller 272 can actuate the clutch ring 120 to reduce the target velocity back toward the first axial velocity V1 after the tooth abutment position and maintain the first axial velocity V1 to the engaged position.

In the illustrated non-limiting example, at process block 630, the controller 272 can command the solenoid actuator 236 to actuate the clutch ring 120 to target a third axial velocity V3 at a position between the tooth abutment position 560 and the engaged position. At process block 640, the controller 272 can command the solenoid actuator 236 to actuate the clutch ring 120 to target a fourth axial velocity V4 at or about the engaged position. Similar to process block 620, the position at which the controller 272 can command the solenoid actuator 236 to actuate the clutch ring 120 to target a fourth axial velocity V4 can vary based on the particular application, for example, to balance the force applied to the clutch ring 120 with the velocity of the clutch ring 120.

Referring now to FIG. 10, a non-limiting example of the velocity profile 660 is illustrated. The velocity profile 660 demonstrates a predetermined relationship between the axial position of the clutch ring 120 (or pin 240) and the axial velocity of the clutch ring 120 (or the pin 240). The velocity profile 660 includes the first axial velocity V1, the second axial velocity V2, the third axial velocity V3, and the fourth axial velocity V4. The different predetermined velocities V1, V2, V3, V4, targeted by the controller 272, are dependent on the sensed position of the clutch ring 120, for example, via the detection of the position of the solenoid actuator 236 or a structure actuatable by the solenoid actuator 236 (e.g., the pin 240).

In the illustrated non-limiting example, a first range R1, at which the target velocity is the first axial velocity V1, is defined between a disengagement position ("DEP") and a predetermined first position P1. In some non-limiting examples, the predetermined first position P1 is the tooth abutment position 560, or a position between the DEP and the tooth abutment position 560. Accordingly, in some non-limiting examples, it is possible that the predetermined first position P1 occurs prior to the tooth abutment position 560, as may help to ensure that the clutch ring 120 is at or about the second axial velocity V2 at tooth abutment. For example, as mentioned above, it is possible that the clutch ring 120 can be between the first axial velocity V1 and the second axial velocity V2 at tooth abutment.

Relatedly, the exact location of the first predetermined position P1 relative to DEP and the tooth abutment position 560 can vary based on the particular application. For example, due to manufacturing tolerances and other system variabilities, the distance between DEP and tooth abutment position 560 can vary. Accordingly, in some non-limiting examples, the location of the first predetermined position P1 can be set by, for example, the controller 272, based on a determined (e.g., a learned) tooth abutment position. Accordingly, the first predetermined position P1, as well as the other positions discussed below, or more generally, the velocity profile 660, can be optimized for a particular application, as may maximize system performance. Put another way, the predetermined velocity profile 660 may be dependent on the tooth abutment position 560.

A second range R2, at which the target velocity is the second axial velocity V2, is defined between the predetermined first position P1 and a predetermined second position P2. A third range R3 is defined between the predetermined second position P2 and a predetermined third position P3. In some non-limiting examples, the predetermined third position P3 is the engaged position EP. In other non-limiting examples, the predetermined third position P3 can be before the engaged position EP so that a fourth range R4 is defined between the third predetermined position P3 and the engagement position ("EP"). In this way, the position can be selected so as to provide sufficient force to ensure the clutch ring 120 reaches the engagement position EP, while also minimizing the velocity to reduce noise and vibration. The engagement position EP can be defined as a position where the clutch ring 120 is fully engaged with the hub gear 124 and the clutch ring 120 is at the end of its axial travel range.

During the first range R1 between the disengagement position and the first position P1, the controller 272 commands the solenoid actuator 236 to actuate the clutch ring 120 at the predetermined first velocity V1. For example, the predetermined first velocity V1 may be a low velocity command to prevent excess NVH as the clutch ring 120 moves toward the tooth abutment position 560. As the clutch ring 120 reaches the first position P1 (e.g., the tooth abutment position 560 or prior to the tooth abutment position 560), the controller 272 commands the solenoid actuator 236 to increase the velocity of the clutch ring 120 to the second velocity V2. The increased second velocity V2 can prevent the clutch ring 120 from "bouncing back" off of the driven member 104, and in addition, hold the clutch ring 120 against the driven member (e.g., against the face of the hub gear 124 coupled to the driven member 104) such that, when the teeth of the driven member 104 and the clutch ring 120 move into a relative rotational position that allows for meshing of the teeth, the clutch ring 120 will be driven to move toward the engagement position. In the illustrated non-limiting example, the predetermined second velocity V2 may be a high velocity command that is greater than the first velocity V1. For example, in some cases, the second velocity V2 can be two, three, four, or more than four times greater the first velocity V1.

As the clutch ring 120 reaches the second position P2, the controller 272 commands the solenoid actuator 236 to decrease the velocity of the clutch ring 120 to the predetermined third velocity V3, which can prevent excess NVH by reducing the speed of the clutch ring 120 prior to reaching its end-of-travel at the engagement position. More specifically, in the illustrated non-limiting example, the predetermined first velocity V1 and the predetermined third velocity V3 can be equal to one another (e.g., have the same magnitude). However, in other non-limiting examples, the first and third velocities may be different.

As the clutch ring 120 reaches the third position P3, the controller 272 commands the solenoid actuator 236 to increase the velocity of the clutch ring 120 to the predetermined fourth velocity V4 to ensure that the clutch ring 120 is driven to the engaged position EP. In some non-limiting examples, the predetermined second velocity V2 and the predetermined fourth velocity V4 may be equal to one another. In other non-limiting examples, the second and fourth velocities may be different. In the illustrated non-limiting example, the second velocity V2 is greater than the first velocity V1. In the illustrated non-limiting example, the fourth velocity V4 is greater than the third velocity V3. For example, in some cases, the fourth velocity V4 can be two, three, four, or more than four times greater the third velocity V3.

While the method 500 is discussed above in regard to velocity control, it is also possible to achieve similar results using current control, wherein a controller can be configured to command a current to be supplied to a solenoid actuator, which can be associated with an axial velocity of a clutch ring. For example, in some cases, the controller 272 can be configured to operate in a current control mode, in which commanding an axial velocity of the clutch ring 120 can include commanding a magnitude of current that is sent to the solenoid actuator 236. Thus, commanding the first axial velocity V1 at process block 610 can include commanding that a first current be supplied to the solenoid actuator 236, commanding the second axial velocity V2 at process block 620 can include commanding that a second current be supplied to the solenoid actuator 236, commanding the third axial velocity V3 at process block 630 can include commanding that a third current be supplied to the solenoid actuator 236, and commanding the fourth axial velocity V4 at process block 640 can include commanding that a fourth current be supplied to the solenoid actuator 236. Correspondingly, the magnitude of the current supplied to the solenoid actuator 236 can depend, at least in part, on a position of the clutch ring 120. Further, in some cases, for example, when targeting the second axial velocity V2 at process block 620 or the fourth axial velocity V4 at process block 640, the specific target velocity can be selected so as to provide a maximum current to the solenoid actuator 236 (e.g., as may cause magnetic saturation of the solenoid actuator 236).

Figure 11:
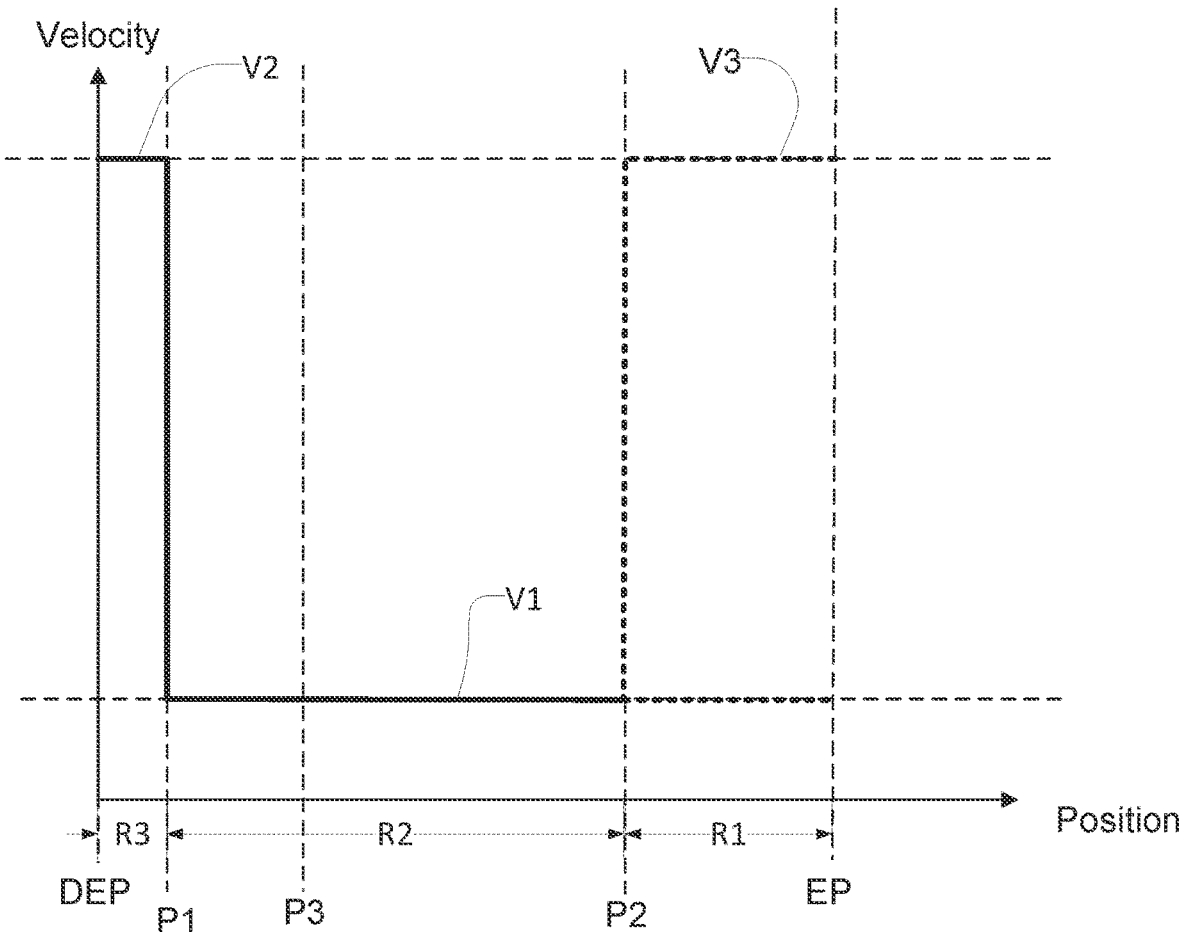
FIG. 11 is a schematic illustration of another velocity profile.

Further, principles of the method 500 can also be applied more generally when moving a clutch ring toward an obstacle (e.g., an engagement point or end stop), as can help to ensure that the clutch ring reaches the desired position, while also reducing noise vibration and harshness. For example, FIG. 11 illustrates another non-limiting example of a velocity profile 700 corresponding to a disengagement profile for the clutch ring 120. While the velocity profile 700 is described with respect to disengagement of the disconnect system 100, and more specifically when the clutch ring 120 is approaching an end stop associated with the disengaged position DEP, it can also be used at other obstacles.

As shown in FIG. 11, the controller 272 can command the solenoid actuator 236 to move the clutch ring 120 from an end stop associate the engaged position EP to an end stop associated with the disengaged position DEP. More specifically, the controller 272 can command the solenoid actuator 236 to move the clutch ring toward the disengaged position DEP at a first axial velocity V1 (e.g., by commanding a first target velocity or a first current). The first axial velocity V1 can be a "low" velocity to reduce noise and vibration as the clutch ring 120 travels toward the disengaged position DEP.

At a first axial position P1 between the engaged position EP and the disengaged position DEP, the controller 272 can command the solenoid actuator 236 to target a second axial velocity V2 (e.g., by commanding a second target velocity or a second current). The second axial velocity can be a "high" velocity that is greater than the first axial velocity V1, and the first position P1 can be selected to be within about 10 mm, 5 mm, 2 mm, 1 mm, 0.5 mm, or 0.25 mm of the disengaged position DEP. As similarly described above, depending on the particular distance between the first position P1 and the disengaged position DEP, the clutch ring 120 may not achieve the second axial velocity V2 upon reaching the disengaged position DEP, which may be beneficial to reduce noise and vibration. Further, even though there may be little to no change in the actual velocity of the clutch ring 120, the current increase associated with commanded velocity, as well as any acceleration experienced by the clutch ring 120, can still increase the force that is applied to the clutch ring 120, thereby reducing the risk that the clutch ring 120 may bounce off of the end stop at the disengaged position DEP.

Still referring to FIG. 11, in some non-limiting examples, the first velocity V1 can be maintained from the engaged position EP to the first position P1. However, in some cases, for example to reduce the total time for disengagement of the disconnect system 100, it is possible that the controller 272 can be configured to operate the solenoid actuator 236 target a third axial velocity V3 that is greater than the first axial velocity V1 for at least a portion of the distance between the engaged position EP and the first position P1.

For example, as illustrated in FIG. 11, the controller 272 can command the solenoid actuator 236 to target the second axial velocity along a first range R1 between the engaged position and the second position P2, to target the first axial velocity along a second range R2 between the second position P2 and the first position P1, and to target the second axial velocity V2 along a third range R3 between the first position P1 and the disengaged position DEP. In some cases, it may be preferrable that the second position P2 is between the engaged position and a third position P3 that may correspond with the tooth abutment position 560. In this way, the clutch ring 120 may decelerate through the tooth abutment position 560, as can further reduce noise, vibration, and harshness during disengagement.

Figure 12:
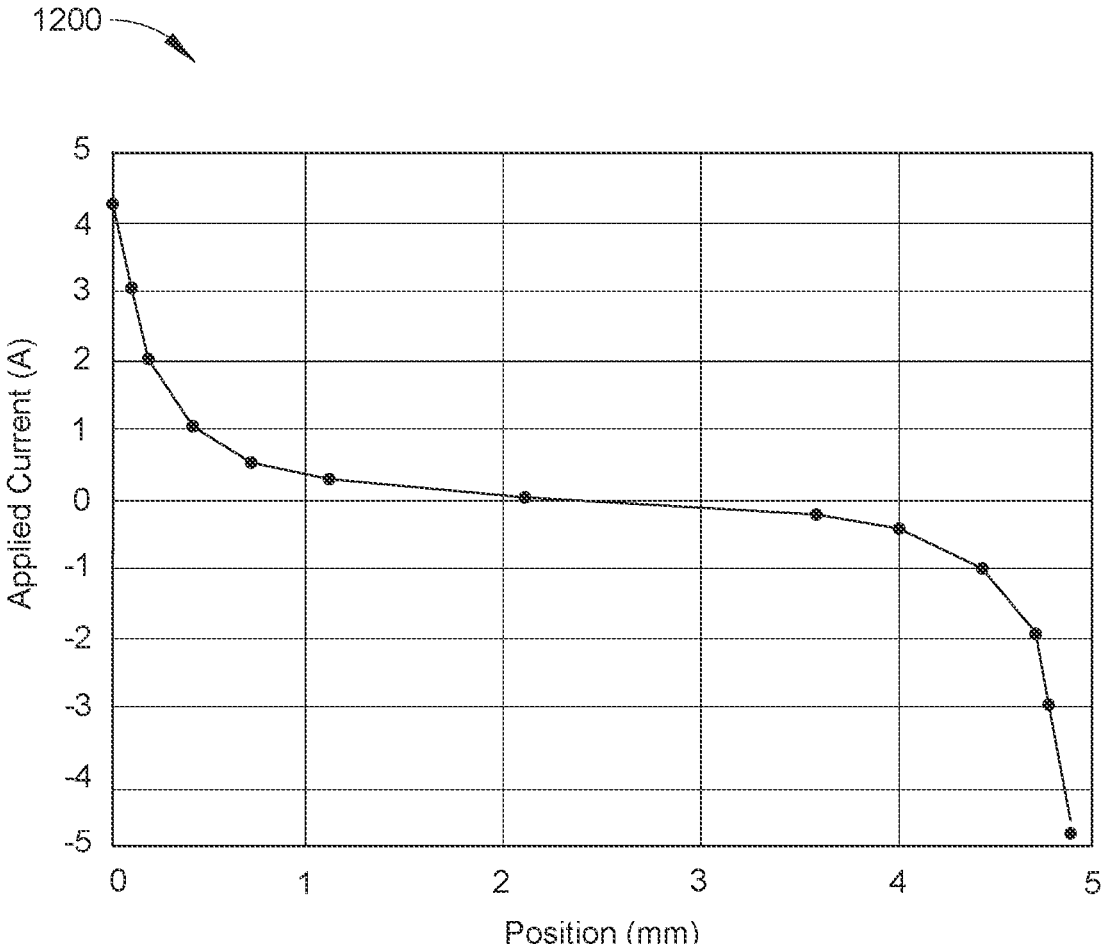
FIG. 12 is an example lookup table that can be used in the rotary disconnect system of FIG. 1A.

Referring to FIG. 12, a non-limiting example of a lookup table 1200 that can be used in the rotary disconnect system 100 is illustrated. The lookup table 1200 (LUT) can be used by the controller 272, for example, to determine an appropriate current command to send to the solenoid actuator 236 to cause the solenoid actuator 236 to move the clutch ring 120 in accordance with a determined target axial velocity. The lookup table 1200 can be a feed-forward lookup table that receives an input position (e.g., the actuation position of the solenoid actuator 236, the axial position of the clutch ring 120, the axial position of the pin 240, etc. as detected by the sensor 255) and correlates the input position to an output current (e.g., an output current for applying to the solenoid actuator 236). The lookup table 1200 can be used to help remove the bi-stable portion of the output of the solenoid actuator 236. As a result, the controller 272 may not have to overcome the latch forces of the solenoid actuator because the lookup table 1200 can provide an output current for applying to the solenoid actuator 236 to mitigate the effects of the latch forces. Accordingly, the lookup table 1200 can be used to get a more linear response from the solenoid actuator 236 to avoid system delay (e.g., due to the required time to build to max current at end points). Additionally, the rotary disconnect system 100 (e.g., the controller 272) can use the lookup table 1200 to return a desired current in the event of an integral reset (e.g., if the any components of the rotary disconnect system 100 get stuck). The lookup table 1200 is illustrated as a one-dimensional (1D) lookup table in FIG. 12, and the use of a 1D lookup table can provide advantages in terms of computing resource efficiency in some applications. However, other types of lookup tables beyond 1D lookup tables can also be used for similar purposes. Moreover, the lookup table 1200 can be modified for use with any suitable type of excitation command, including various types of voltage commands in addition to current commands.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A rotary disconnect system for selectively coupling a drive member and a driven member, the rotary disconnect system comprising:
   a clutch ring rotationally coupled to the drive member;
   a solenoid actuator adapted to move the clutch ring between an engaged position, in which the clutch ring is rotationally coupled to the driven member, and a disengaged position, in which the clutch ring is rotationally decoupled from the driven member;
   a sensor configured to detect an actuation position of the solenoid actuator, wherein the actuation position of the solenoid actuator is indicative of an axial position of the clutch ring; and
   a controller in communication with the solenoid actuator and the sensor, the controller configured to:

receive, from the sensor, the actuation position of the solenoid actuator;
   determine a target axial velocity for the clutch ring based on the actuation position of the solenoid actuator received from the sensor;
   determine a first current for applying to the solenoid actuator based on the target axial velocity;
   determine a second current for applying to the solenoid actuator by applying the actuation position of the solenoid actuator received from the sensor as input to a lookup table, wherein the second current mitigates latch forces on the solenoid actuator, and wherein the lookup table correlates the actuation position of the solenoid actuator to a magnitude for the second current; and
   provide a current command to the solenoid actuator based on the first current and the second current to cause the solenoid actuator to move the clutch ring in accordance with the target axial velocity.

2. The rotary disconnect system of claim 1, comprising a shift fork coupled to the clutch ring and actuatable by the solenoid actuator to move the clutch ring between the engaged position and the disengaged position.

3. The rotary disconnect system of claim 2, wherein the shift fork is configured to pivot about an axis upon movement of the rotary disconnect system.

4. The rotary disconnect system of claim 1, wherein the sensor is configured to detect a position of a pin of the solenoid actuator at a first position correlating to the disengaged position of the clutch ring and at a second position correlating to the engaged position of the clutch ring.

5. The rotary disconnect system of claim 1, wherein the lookup table is a one-dimensional lookup table.

6. The rotary disconnect system of claim 1, wherein the controller is configured to determine the target axial velocity for the clutch ring by comparing the position of the solenoid actuator received from the sensor to a predetermined velocity profile.

7. The rotary disconnect system of claim 6, the predetermined velocity profile defining:
   a first range of solenoid actuator positions associated with a first target axial velocity; and
   a second range of solenoid actuator positions associated with a second target axial velocity and a tooth abutment position of the clutch ring.

8. The rotary disconnect system of claim 1, wherein the sensor comprises a Hall effect sensor.

9. The rotary disconnect system of claim 1, wherein the solenoid actuator is bi-stable.

10. The rotary disconnect system of claim 1, wherein the rotary disconnect system does not comprise an element for providing lost motion functionality between the solenoid actuator and the clutch ring.

11. A method of controlling a rotary disconnect mechanism, comprising:
   determining a position of a clutch ring that is rotationally coupled to a drive member in the rotary disconnect mechanism based on data received from a sensor, wherein:
      the clutch ring is configured to be moved between an engaged position, in which the clutch ring is rotationally coupled to a driven member, and a disengaged position, in which the clutch ring is rotationally decoupled from the driven member, by a solenoid actuator;

the sensor is configured to detect an actuation position of the solenoid actuator, the actuation position of the solenoid actuator indicative of the position of the clutch ring;

determining a target axial velocity for the clutch ring based on the position of the clutch ring;

determining a first current for applying to the solenoid actuator based on the target axial velocity;

determining a second current for applying to the solenoid actuator by applying the position of the clutch ring as input to a lookup table, wherein the second current mitigates latch forces on the solenoid actuator, and wherein the lookup table correlates the position of the clutch ring to a magnitude for the second current; and providing an excitation command to the solenoid actuator based on the first current and the second current to cause the solenoid actuator to move the clutch ring in accordance with the target axial velocity.

12. The method of claim 11, wherein the lookup table is a one-dimensional lookup table.

13. The method of claim 11, wherein determining the target axial velocity for the clutch ring comprises comparing the position of the clutch ring to a predetermined velocity profile.

14. The method of claim 13, wherein the predetermined velocity profile defines:

a first range of clutch ring positions associated with a first target axial velocity; and a second range of clutch ring positions associated with a second target axial velocity and a tooth abutment position of the clutch ring.

15. The method of claim 11, wherein the sensor comprises a Hall effect sensor.

16. The method of claim 11, wherein the excitation command comprises a current command.

17. The method of claim 11, wherein the sensor is configured to detect a position of a pin of the solenoid actuator at a first position correlating to the disengaged position of the clutch ring and at a second position correlating to the engaged position of the clutch ring.

18. The method of claim 11, wherein the solenoid actuator is bi-stable.

* * * * *